Oct. 21, 1941.  M. A. CARMODY  2,259,612
MEANS FOR AUTOMATICALLY COUPLING TRACTOR-SEMITRAILER COMBINATIONS
Filed July 2, 1940   2 Sheets-Sheet 1

INVENTOR
MICHAEL A. CARMODY
BY
Beau, Brooks, Buckley & Beau.
ATTORNEYS

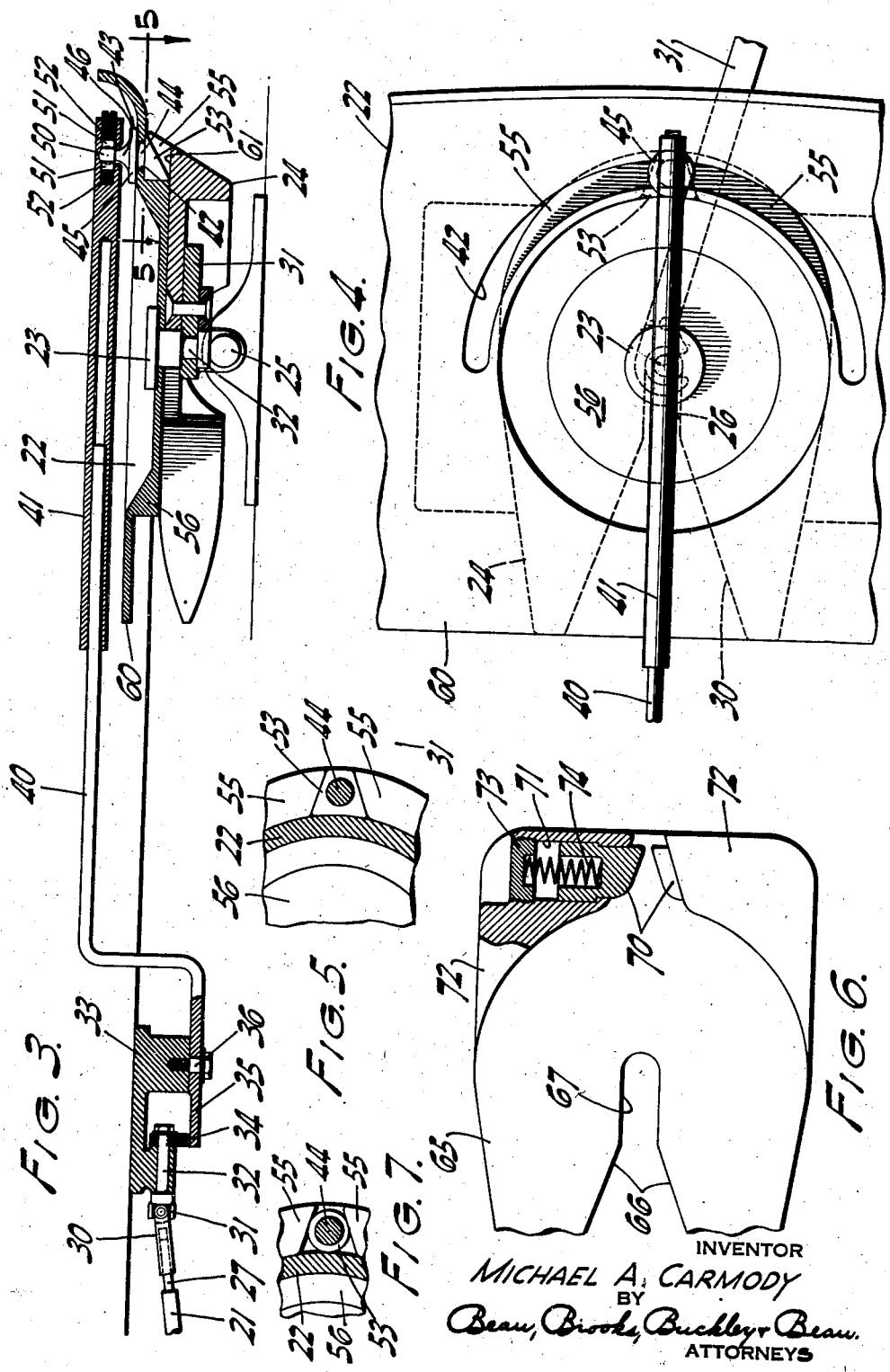

Patented Oct. 21, 1941

2,259,612

UNITED STATES PATENT OFFICE 2,259,612

MEANS FOR AUTOMATICALLY COUPLING TRACTOR-SEMITRAILER COMBINATIONS

Michael A. Carmody, Buffalo, N. Y., assignor of one-half to Henry Schaefer, Jr., Buffalo, N. Y.

Application July 2, 1940, Serial No. 343,626

7 Claims. (Cl. 280—33.1)

My invention relates in general to tractor-semi-trailer combinations having means for steering the trailer part of the combination, and more particularly to means for automatically coupling such steering mechanism.

It is well known to those skilled in the art that in tractor-semi-trailer combinations it is necessary that the coupling and uncoupling of the two parts of such combination be accomplished preferably from the driver's seat. When the semi-trailer part of such combination is provided with steering means it is desirable to automatically couple such steering means at the same time that the power unit and tractor unit are coupled.

The principal object of my invention has been, therefore, to provide coupling means for the steering mechanism of tractor-semi-trailer combinations which shall be automatically coupled or uncoupled when the two parts of the combination are coupled or uncoupled.

Another object has been to provide coupling means which are simple in design and durable in operation, and which require very little alteration in the general construction of the tractor combination.

Moreover, it has been an object to permanently mount the coupling means upon the upper fifth wheel of the combination and to provide an engaging recess in the lower fifth wheel, located forwardly of the kingpin, to centralize and couple the steering mechanism with the power unit of the combination.

Furthermore, my device is of such a nature that it remains permanently coupled as long as the kingpin of the combination is in engagement with the fifth wheel parts.

The above objects and advantages have been accomplished by the device shown in the accompanying drawings, of which:

Fig. 3 is an enlarged, fragmentary, side elevation of my device and is taken on line 3—3 of Fig. 2.

Fig. 4 is an enlarged, fragmentary, plan view of a portion of my device.

Fig. 5 is a fragmentary, sectional view showing the coupling wedge of my device and is taken on line 5—5 of Fig. 3.

Fig. 6 is an enlarged, fragmentary, plan view of a modified form of lower fifth wheel.

Fig. 7 shows a modified form of coupling member.

Figure 1:
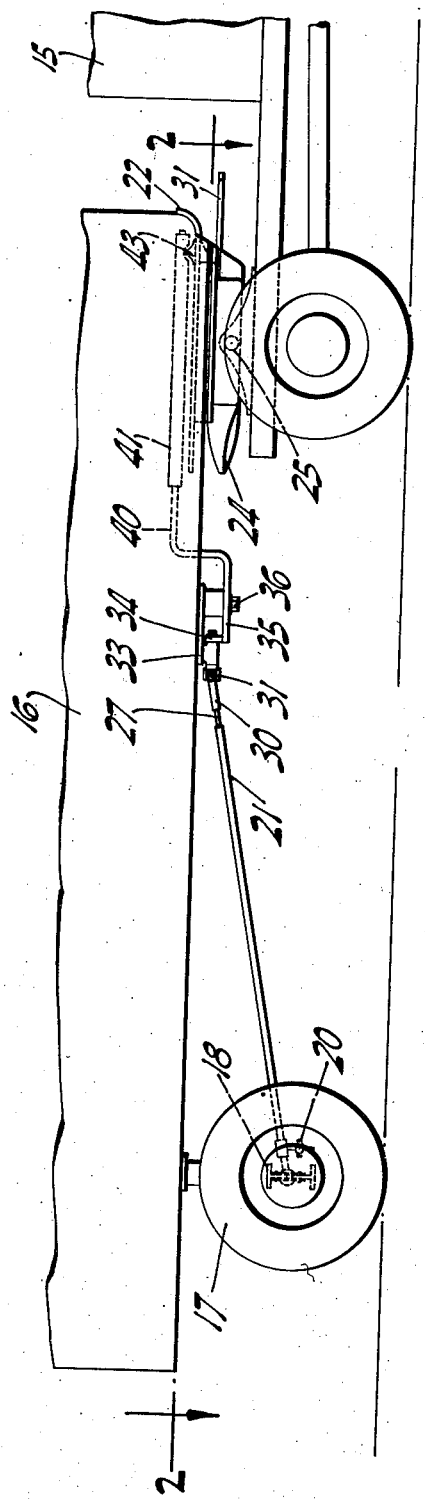
Fig. 1 is a fragmentary, side elevation of a tractor-semi-trailer combination equipped with my invention.

In the drawings, 15 is the power unit and 16 the semi-trailer unit of a tractor-semi-trailer combination, to which my invention is applicable. As is well known, in this form of device the rear end of the semi-trailer is supported by wheels 17 which are mounted upon a suitable axle 18. Since my invention is applicable to semi-trailers having steering means for the rear supporting wheels or ground-engaging supports, each of these wheels is shown mounted upon a steering knuckle 19. These steering knuckles are connected together by means of a connecting link 20 which is reciprocated in suitable manner by a steering shaft 21, to be hereinafter described.

The forward end of the semi-trailer is provided with an upper fifth wheel 22 which carries the kingpin 23 of the combination. The upper fifth wheel is, of course, supported by the lower fifth wheel 24 of the power unit which is suitably mounted in trunnion bearings 25 carried by the power unit. The kingpin 23 is carried by the upper fifth wheel and engages with the usual slot 26 provided at the inner end of the flaring mouth 30 of the lower fifth wheel. The usual latching means 31 are provided for engagement with the usual groove 32 of the kingpin when the kingpin is at the forward end of the slot 26 of the lower fifth wheel.

The forward end of the steering shaft 21 is provided with a reduced portion 27 which is mounted within a sleeve 30. The upper end of the sleeve is attached to a universal joint 31 which is carried by a gear shaft 32. The gear shaft is carried by a suitable bracket 33 secured preferably to the under side of the chassis of the trailer unit. A steering gear 34 is carried at the forward end of the gear shaft 32 and, meshing with the teeth thereof, are the teeth of a gear segment 35. This gear segment is pivotally carried by a pivot bolt 36 which is secured to the bracket 33. The gear segment is mounted preferably below the gear 34 and, when oscillated, causes the gear shaft 32 to rotate.

The segmental gear 35 preferably forms a part of a steering arm 40 which projects forwardly from the bracket 35 and upon the forward end of which is slidably mounted a steering arm 41 which is preferably in telescoped arrangement therewith.

The upper fifth wheel 22 of my device is formed with an arcuate slot 42 which is struck from the center of the kingpin 23 and which is located in said fifth wheel forwardly of said kingpin. The steering member 43 of my device is mounted within the slot 42 and has a cylindrical portion 44 which engages with the slot. A flange portion 45 is arranged on top of the upper fifth wheel which carries an upwardly extending stud 46, having a ball 50 at its extreme upper end. The ball 50 is rotatably attached to the steering arm 41 in any suitable manner but preferably by the engagement of discs 51 arranged one on each side of the ball and pressed in contact therewith by means of helical springs 52.

The steering member is also provided with a depending coupling element 53 which engages with a coupling recess 54 provided between the interspaced ends of two flange members 55 arranged around the forward periphery of the lower fifth wheel 24. The coupling element and engaging recess may be of any suitable shape, and in the drawings I have shown them wedge-shape in form. In Fig. 7 the connector is cylindrical in form. The central bearing section 56 of the upper fifth wheel is extended downwardly below the flange portion 60 thereof, and the connector is of such height as to extend from the lower surface of the flange member 60 to the bottom surface of the central bearing portion 56. The flange members 55 are extended upwardly from the upper surface 61 of the lower fifth wheel and therefore will be engaged by the coupling element 53 when the parts are in the position shown in Figs. 3, 4 and 5.

Figure 2:
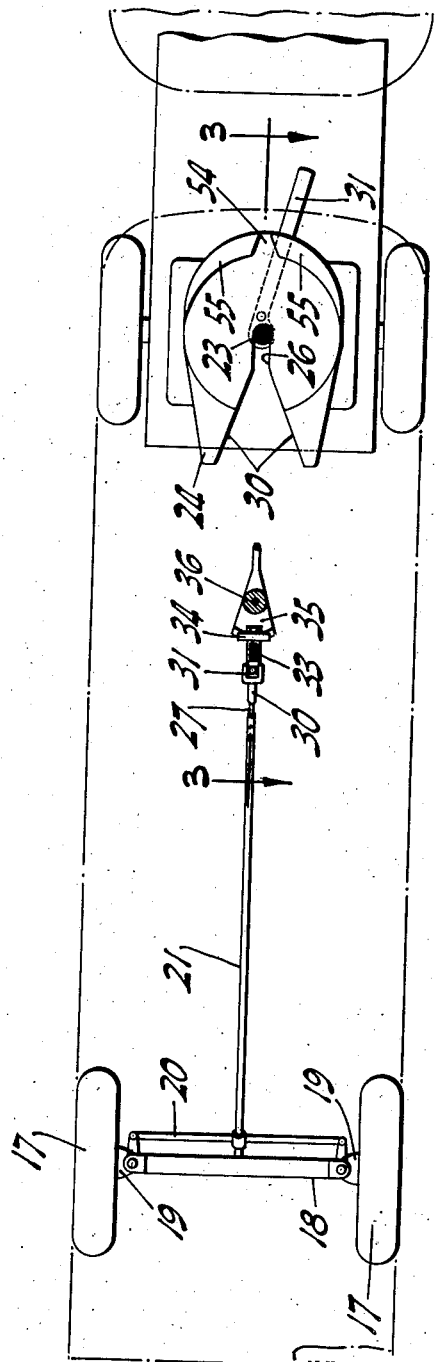
Fig. 2 is a sectional, plan view thereof taken on line 2—2 of Fig. 1.

Referring now to the modified form of Fig. 6, the lower fifth wheel 65 is formed as usual with the open flaring mouth 66 and with the slot 67 for the reception of the kingpin 23 of the semi-trailer. Instead of the rigid tapered surfaces at the adjacent ends of the flange members 55 of the form of invention shown in Figs. 1 to 5, inclusive, the fifth wheel in this form is provided with resilient jaws 70 for forming the coupling recess. Each of the jaws is slidably mounted within a suitable guideway 71 formed in the flange member 72 carried at the forward side of the lower fifth wheel. A screwthreaded plug 73 is carried by each of the flange members at the outer end of the guideway 71 thereof, and a helical spring 74 is mounted within the guideway, having one of its ends bearing against the plug 73 and its other end against the resilient jaw 70.

When the power unit of the tractor-semi-trailer combination is to be coupled to the trailer unit, the power unit is aligned with the semi-trailer and is backed up until the kingpin enters the slot 26 and is moved to the end of the slot, whereupon the latching means 31 serve to couple the kingpin to the power unit. During such rearward movement of the power unit, the steering member will be carried forwardly by the upper fifth wheel over the lower fifth wheel, and the coupling element 53 of such member will enter the coupling recess 54 between the flange members 55 and become seated in said opening coincident with the seating of the kingpin in its slot 26.

When the parts are thus coupled, any turning movement of the power unit with respect to the trailer unit will cause the steering lever 40 and arm 41 to be oscillated about the pivot bolt 36 of the segmental gear. This oscillatory movement of the segmental gear will cause the steering shaft 21 to be rotated through the medium of the steering gear 24, steering shaft 32, universal joint 31, and sleeve 30. As hereinbefore pointed out, rotative movement of the steering shaft 21 will be imparted through suitable connecting means to the connecting link 20, causing the wheels 17 to be moved in a direction opposite to the movement of the power unit.

When using the modified form of invention shown in Fig. 6, should the power unit be slightly out of alignment with the trailer unit when the parts are being coupled, the coupling element 53 entering the coupling recess between the resiliently mounted jaws 70 will either compress the spring 74 of the jaw with which it first contacts or else will cause the steering mechanism to be centralized. Should the load upon the rear wheels be such as to make it difficult for the steering mechanism to be centralized, then the jaw which engages the coupling element will be depressed until such time as the semi-trailer is moved forwardly, at which time the helical springs 74 will centralize the steering mechanism and maintain it in such position while engaged.

It is obvious that when the steering member 43 is moved in an arcuate direction about the kingpin 23 and within the slot 42, the angular movement and varying length of the steering lever and arm will be compensated for by the telescopic connection between these two parts. It will be obvious from the foregoing that the coupling and uncoupling of the steering mechanism is automatically accomplished when the power unit is coupled or uncoupled from the trailer unit and that it does not in any wise interfere with or change the mode of coupling of the units of a tractor-semi-trailer combination.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. In a tractor-semi-trailer combination having connection therebetween, including an upper and a lower fifth wheel and a kingpin, said upper fifth wheel being formed with an arcuate slot substantially concentric with said kingpin, ground-engaging supports for said trailer, means interconnecting said supports for steering, means to steer said supports as said tractor assumes an angle with respect to said semi-trailer, said steering means including a shaft connected to and extending forwardly from the steering means, a steering member slidably mounted in the arcuate slot of said upper fifth wheel, said member having a coupling element for engagement with the lower fifth wheel, a steering arm connected adjacent one of its ends to said steering member in front of said kingpin and pivotally connected to said trailer adjacent its other end, and means interconnecting said shaft and said arm so constructed and arranged that the trailer supports are turned in a direction opposite to that assumed by the tractor.

2. In a tractor-semi-trailer combination having connection therebetween, including an upper and a lower fifth wheel and a kingpin, said upper fifth wheel being formed with an arcuate slot, ground-engaging supports for said trailer, means interconnecting said supports for steering, means to steer said supports as said tractor assumes an angle with respect to said semi-trailer, said steering means including a shaft connected to and extending forwardly from the steering means, a steering member slidably carried by said upper fifth wheel and held thereby against axial movement, said member having a coupling element for engagement with the lower fifth wheel, a steering arm connected adjacent one of its ends to said steering member in front of said kingpin and pivotally connected to said trailer adjacent its other end, and means interconnecting said shaft and said arm so constructed and arranged that the trailer supports are turned in a direction opposite to that assumed by the tractor.

3. In a tractor-semi-trailer combination having connection therebetween, including an upper and a lower fifth wheel and a kingpin, said upper fifth wheel being formed with an arcuate slot substantially concentric with said kingpin, said lower fifth wheel being formed forwardly of the vertical axis thereof with a recess, ground-engaging supports for said trailer, means interconnecting said supports for steering, means to steer said supports as the tractor assumes an angle with respect to said semi-trailer, said steering means including a shaft connected to and extending forwardly from the steering means, a steering member slidably mounted in the arcuate slot of said upper fifth wheel, said memebr having a coupling element for engagement with the recess of said lower fifth wheel, a steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

4. In a tractor-semi-trailer combination having connection therebetween, including an upper and a lower fifth wheel and a kingpin, said upper fifth wheel being formed with an arcuate slot substantially concentric with said kingpin, said lower fifth wheel being formed at its forward peripheral edge with two interspaced flanges, ground-engaging supports for said trailer, means interconnecting said supports for steering, means to steer said supports as the tractor assumes an angle with respect to said semi-trailer, said steering means including a shaft connected to and extending forwardly from the steering means, a steering member slidably mounted in the arcuate slot of said upper fifth wheel, said member having a coupling element for engagement with the space between the flanges of said lower fifth wheel, a steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

5. In a tractor-semi-trailer combination having connection therebetween including a lower fifth wheel carried by said tractor, said lower fifth wheel being formed with a V-shaped slot extending rearwardly and terminating in a coupling recess, a slot located forwardly of said coupling recess, an upper fifth wheel and a kingpin fixed to said upper fifth wheel and engageable in the V-shaped slot and coupling recess of said lower fifth wheel upon relative longitudinal movement of said fifth wheels, ground-engaging supports for said trailer, means interconnecting said supports for steering, means to steer said supports as the tractor assumes an angle with respect to said semi-trailer, said steering means including a shaft connected to and extending forwardly from said steering means, a steering member pivotally carried by said upper fifth wheel and being movable thereon in a definite path during relative steering movement of the tractor and trailer, said member being engageable with said slot, said lower fifth wheel upon relative longitudinal movement of said fifth wheels, a steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

6. In a tractor-semi-trailer combination having connection therebetween including a lower fifth wheel carried by said tractor, said lower fifth wheel being formed with a V-shaped slot extending rearwardly and terminating in a coupling recess, a slot located forwardly of said coupling recess, an upper fifth wheel carried by said trailer and supported by said lower fifth wheel and a kingpin fixed to said upper fifth wheel and engageable in the V-shaped slot and coupling recess of said lower fifth wheel upon relative longitudinal movement of said fifth wheels, ground-engaging supports for said trailer, means interconnecting said supports for steering, means to steer said supports as the tractor assumes an angle with respect to said semi-trailer, said steering means including a shaft connected to and extending forwardly from the steering means, a steering member pivotally carried by said upper fifth wheel and being slidably movable thereon in an arcuate path during relative steering movement of the tractor and trailer, said member being engageable with the slot in said lower fifth wheel upon relative longitudinal movement of said fifth wheels, a steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

7. In a tractor-semi-trailer combination having connection therebetween including a lower fifth wheel carried by said tractor and formed with a V-shaped slot and terminating in a coupling recess, said lower fifth wheel having arcuate flanges located forwardly of the coupling recess and arranged so as to form a slot therebetween, an upper fifth wheel carried by said trailer and supported by said lower fifth wheel, said upper fifth wheel having a central portion engageable with said arcuate flanges of said lower fifth wheel and of kingpin fixed to said upper fifth wheel and engageable in the V-shaped slot and coupling recess of said lower fifth wheel upon relative longitudinal movement of said fifth wheels, ground-engaging supports for said trailer, means interconnecting said supports for steering, means to steer said supports as the tractor assumes an angle with respect to said semi-trailer, said steering means including a shaft connected to and extending forwardly from said steering means, a steering member pivotally carried by said fifth wheel and being movable thereon in a definite path during relative steering movement of the tractor and trailer, said member being engageable with said slot in said lower fifth wheel upon said relative longitudinal movement of said fifth wheels, a steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

MICHAEL A. CARMODY.